Aug. 4, 1931.  A. CAMPBELL ET AL  1,817,347
CAR DOOR
Filed Aug. 20, 1928  3 Sheets-Sheet 1

Witness:
William P. Kilroy

Inventors
Argyle Campbell
George B. Willard
By
George J. Haight
Atty

Patented Aug. 4, 1931

1,817,347

UNITED STATES PATENT OFFICE

ARGYLE CAMPBELL, OF CHICAGO, AND GEORGE B. WILLARD, OF WESTERN SPRINGS, ILLINOIS, ASSIGNORS TO ENTERPRISE RAILWAY EQUIPMENT COMPANY, OF CHICAGO, ILLINOIS, A CORPORATION OF ILLINOIS

CAR DOOR

Application filed August 20, 1928. Serial No. 300,862.

This invention relates to car doors.

An object of our invention is to provide sliding car doors for railway cars which will be light in weight and thoroughly braced against racking, and be further braced to resist bending and buckling along various cross lines and which, when in position across a door opening, will operate to brace and strengthen the car framing.

Another object of our invention is to provide a bottom supported door having great vertical strength whereby the door will be continuously and strongly braced from its lowermost support to the upper margin thereof and thus be able to withstand the bending tendency due to the impact of lading against the door and to sustain the wear and tear arising from the pounding of the door on its supports as the car passes over uneven road-beds.

Another object of our invention is to provide a side door of simple construction suitable for use in railway cars adapted for transportation of large freight units, such as automobiles, which necessitates door openings of abnormal size, and consequently necessitates large door area. In cars of the identified type the openings in the side of the car are closed with a pair of oppositely sliding doors, one of such doors being in the nature of an auxiliary door and provided with suitable anchoring means for attachment with the car structure at its top and bottom edges and adapted to be released only when the car is being loaded with automobiles or similar bulky freight units.

Another object of our invention resides in the provision of an auxiliary door having a strong reinforcing marginal member at its outer edge which serves as a weatherproof sealing member to prevent the entrance of moisture at the meeting edge of said auxiliary door and its companion door, and also operates as a vertical beam member adapted to brace both the auxiliary door and its associated door when said doors are in meeting relation.

Another object of our invention is to provide a side door having a rigid door post member which will function as an integral member part of the door and have a portion thereof extended outwardly of the door and adapted to embrace the companion door and also have a portion thereof extended inwardly beyond the inner surface of the door.

A more particular object of our invention is the provision of a Z-shaped member as a marginal reinforcement for one of the doors of a pair of sliding doors.

Another object of our invention is the provision of a door jamb construction adapted to receive an upright co-operating strip for supporting the grain doors when the car is loaded with grain or other similar freight.

Still another object of our invention is to provide a door jamb construction wherein the door securing attachments are protected and wherein the parts of the door attachments will operate to effectively brace parts of the door and maintain the door jamb against rotation about a vertical axis.

Other objects of the invention are to provide doors of suitable construction whereby the main body portion of one door of a pair of doors may be used for advertising purposes and the companion door will co-operate in strength-giving qualities with the advertising door to provide a closure unit of great strength.

Our invention further resides in certain other details and features of construction such as will be more fully pointed out hereinafter and claimed.

For further comprehension of our invention reference may be had to the accompanying drawings wherein Fig. 2 is a vertical sectional view on an enlarged scale taken on a line corresponding substantially to a line 2—2 of Fig. 1. Fig. 3 is a vertical detail sectional view taken through the door and on a line corresponding substantially to the line 3—3 of Fig. 1, said view showing so much of the door as necessary to illustrate the door anchoring attachments. Fig. 4 is a view showing a portion of Fig.

3 modified to include an alternate construction of door anchoring means wherein the upper and lower door anchoring means are operated in unison. Fig. 5 is a vertical sectional view of Fig. 4 as viewed from right to left taken on a line 5—5 of Fig. 4.

In the drawings our improvements are shown as applied to a box car of the so-called "double sheathed" type. In said drawings A represents the side sill of the car, B the floor of the car, C the upper top chord of the car slide and D—D the vertical door posts which are spaced from each other lengthwise of the car a sufficient distance to provide a large door opening. The door opening is adapted to be closed by two doors as indicated by E and F respectively, the former being adapted to slide to the left and the latter to the right. The door E is in the nature of an auxiliary door and adapted to come into use only when an enlarged door opening is required for the purpose of loading unusually large units. Said door E is provided on its inner side with upper and lower door fastening mechanisms G and H adapted to respectively co-operate with bolt receiving sockets J and K. On the outer side of the doors there is provided a hasp sealing device L of the usual type. The doors are shown as rolling upon a track M at the bottom, the doors being provided with supporting roller mechanisms N which rest upon said supporting track. Adjacent the upper margin of the door there is disposed the usual guiding track and weather guard O which in the present embodiment consists of a Z-bar rolled section. Cooperating with the Z-bar section there are a plurality of combined corner gussets and guide brackets P secured to the upper portion of the doors.

Each said door includes in its framework an upper horizontal Z bar 10 and a rear vertical marginal member 11 also formed of a Z-bar with the inner flange thereof deformed to present a U-shaped section 12 adapted to extend around and into wedging relation with flanges 13 formed on the related door posts D—D. At the vertical meeting margins of the two doors, the auxiliary door E is provided with a door jamb 14 which is formed of Z-section, preferably a rolled Z-section. Said Z bar section is of greater depth than the depth of the door and is disposed with its web 15 extending transversely of the main plane of the door and with the outer flange 16 disposed in substantially the outer plane of the door and having the inner flange 17 spaced an appreciable distance from the inner plane of the door. Secured to the web 15 of the Z bar 14 adjacent the outer flange thereof is an angle member 18, said member being secured in position by one of its flanges by countersunk rivets 19. At the meeting vertical margins of the doors, there is on the main door F a channel-shaped section having its web 20 extending transversely of the door and its flanges 21 and 22 respectively disposed in the inner and outer plane of the door.

The main body of the door E is preferably formed of three metallic panels as indicated at 23, 24 and 25 respectively, and the body of the door F is formed of upper and lower panels 26 and 27. The said panelling on the respective doors is united with the door framing at the upper horizontal, and at each of the vertical margins of the door, by being riveted to the overlying flanges of the marginal members by rivets 28, and said respective panels on the various doors are united along horizontal lines by rivets 29.

The upper panel of the door F is rigidified along various cross lines by having embosed therein a railroad monogram 30 and the area surrounding said monogram is further rigidified by embossments 31—31 which serve to strengthen the margins of the plate. The lower panels 25 and 27 of the respective doors E and F are bent inwardly to form a horizontally extending wall adjacent the lower margin as indicated at 32 and thence downwardly as at 33, thus presenting a Z-shaped lower margin. On the inner side of each door along the lower part thereof, there is disposed a face plate 34 which overlies the depending flange 33 and is secured thereto by rivets 35; said face plate 34 is extended upwardly in the inner plane of the door for an appreciable distance above the horizontally extending wall section 32 and is then offset inwardly as at 36 and thence upwardly as at 37, thus presenting a Z-shaped section with flanges of unequal length. The flange 37 lies against the inner face of the panel and is secured thereto by rivets 38, thus providing a tubular formation along the horizontal margin of the door and forming a very strong beam which extends from side to side of the door and is preferably welded at the ends thereof to the respective vertical marginal members of the door as indicated at 39. Above the said tubular formation the panelling is reinforced by a series of horizontally extending corrugations 40 which are embossed outwardly beyond the outer face of the marginal members. On the auxiliary door E the horizontal corrugations extend to the top of the door, and on the main door F said corrugations are disposed only as far as the upper edge of the lower panel 27.

Extending diagonally across the corner of each door on the inner side and across the plane of the embossments are beams 41 and 42, said beams being preferably of U-shape and secured at their lower margin by rivets 43 which extend through to the upstanding flange 37 of the face plate 34, said beams being secured to the vertical marginal members of the door by rivets 44. The diagonal beam 41 which is disposed at the rear edge of the door E is extended upwardly of the door a sufficient distance to extend across the plane of the three panels 23, 24 and 25, and thus provides continuity of reinforcement along vertical lines. The continuity of reinforcement for the outer margin of the said door is obtained through the medium of the strong Z-shaped vertical member, and in the door F by the embossments 30 and 31, which provide continuous vertical strength throughout the major portion of the upper panel.

The outer flange 16 of the Z-bar 14 is deformed at 45 to present a flared opening adapted to facilitate the movement of the respective doors into tight wedging engagement with each other. It will be noted that with the doors in closed position the transverse web 20 of the marginal reinforcement on door F abuts the web 15 of Z-bar 14 on the door E and with the doors in this relation the rivets 28 connecting the door panelling with flange 22 are disposed beyond the flared portion 45 of the Z-bar 14, the flange 22 being extended lengthwise in the main plane of the door for this purpose.

At each upper corner of the doors there is the combined guide and corner gusset P for the purpose of rigidifying the framework, said gusset being formed with a main portion 46 and extended upwardly as at 47 to form a door guide. At the junction of the two doors and above the same a hood 48 is provided for the purpose of closing any opening at the junction of said doors.

Inasmuch as the auxiliary door E is adapted for use only in emergencies, such door is provided with locking mechanism operable from the inner side of the car, which when in operative position secures the auxiliary door to the side of the car in such a manner as to virtually render the same a part of the side of the car. The locking mechanism employed for this purpose consists of the upper and lower locking sliding bolt mechanisms G and H. The upper locking mechanism G includes a sliding bolt 49 of substantially round section, said bolt having a lateral extension 50 outstanding from the lower end thereof and its outer end is slightly tapered as indicated at 51. Said bolt is adapted to have reciprocatory movement in brackets 52 and 53, bracket 52 being located adjacent the upper part of the door, and bracket 53 being located an appreciable distance therefrom and preferably at a convenient height from the floor of the car as to be readily accessible to an operator. The upper bracket 52 includes a body portion 54 extending throughout the depth of the Z-beam and is formed with connecting flanges 55, 56 and 57 which respectively connect with the inner face of the door, the web 15 of the Z-bar, and the inner flange 17 of said Z-bar member. Extending upwardly above the body portion 54 there is an integral flange 58 which is secured to the inner vertical flange 59 of the horizontal marginal member 10. The bracket member 53 likewise includes a body portion 60 and is formed with connecting flanges 61, 62 and 63 which connect with the Z-bar parts as described above in connection with bracket 52. Formed integrally with the said bracket 53 are two abutments 64 and 65 which are disposed at different distances lengthwise relatively to the bolt 49 and also disposed in different angular relations relative to the axis of the said bolt 49. Said abutment 64 is formed with a seat 66 of arcuate shape, the latter being adapted to receive the bolt head 50 when the bolt is in projected relation with its associated bolt receiving socket J and thereby maintain the bolt against displacement when the latter is in projected position. The head 50 of the bolt 49, when the latter is in retracted position, as indicated by dotted lines in Fig. 7, rests on the lower shelf 65. The socket J preferably includes a main socket portion 67 and flanges 68 on either side thereof whereby attachment is effected with the depending flange of the Z-bar top chord by rivets 69.

Figure 1:
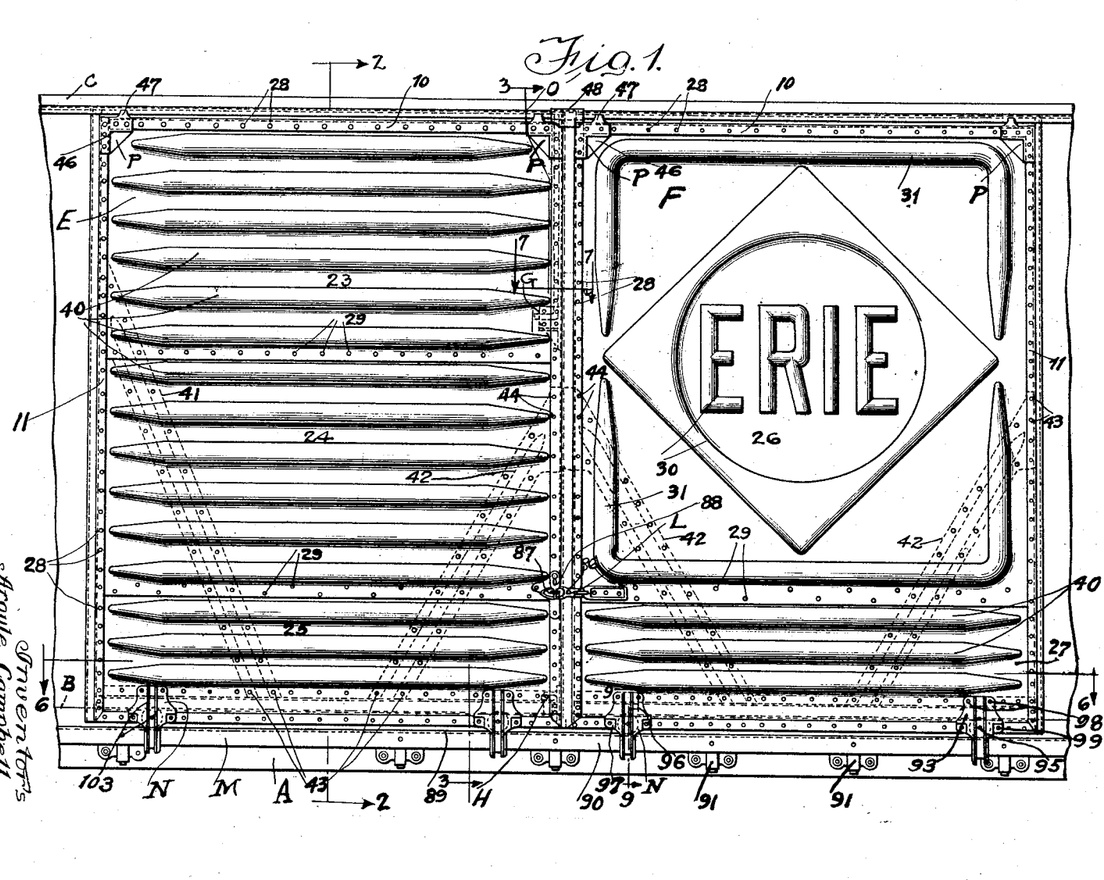
Fig. 1 is a fragmentary side elevational view of a railway car illustrating a pair of doors embodying our improved construction.
Figures 2, 3, 4, 5:
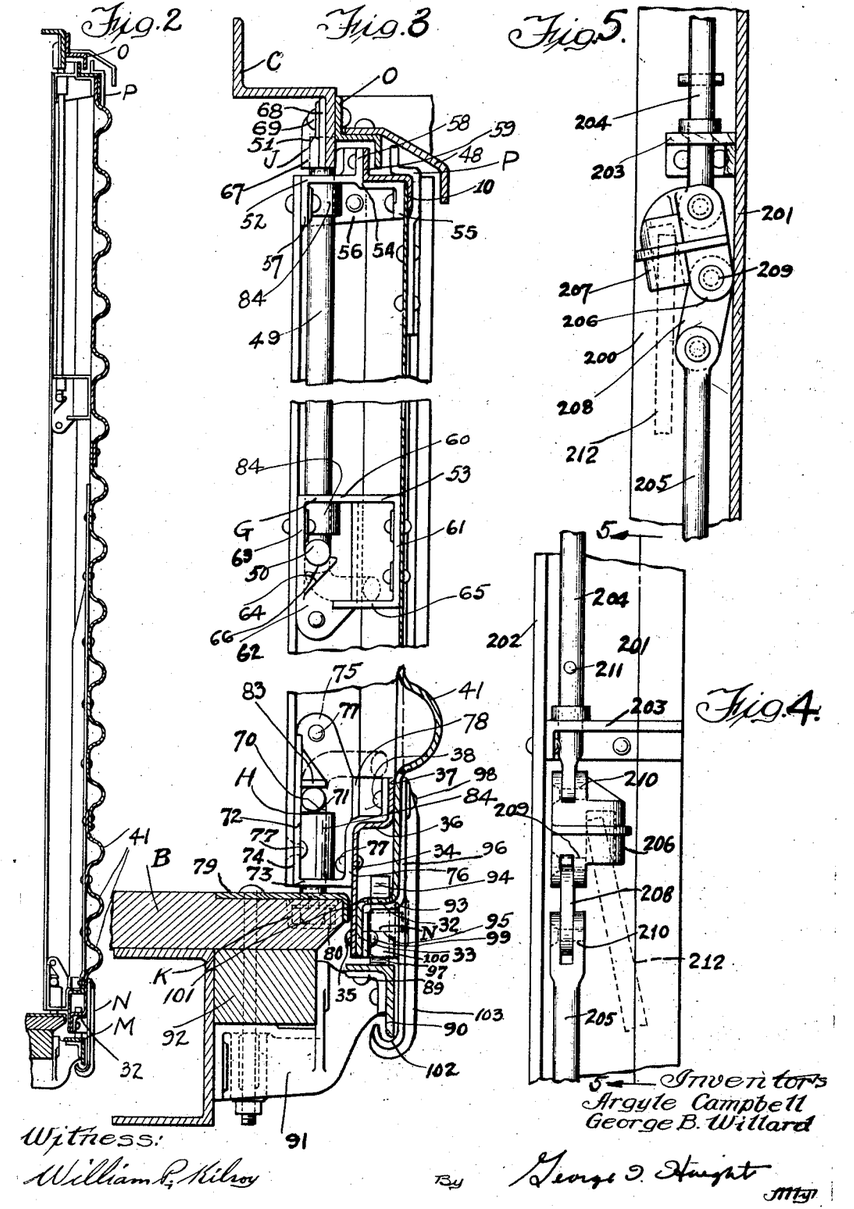

The lower locking mechanism H includes bolt 70 having a laterally extending head 71. Said bolt is mounted for reciprocatory and rotary movement in bracket 72 which is formed with a body portion 73 to extend between the inner flange of the Z-bar, the web of the Z-bar, and the facing plate 34 on the inner face of the door, and connected to said respective members through the medium of flanges 74, 75 and 76 and connecting rivets 77. The bolt in retracted position as indicated by dotted lines in Figs. 3 and 7 is adapted to be rotated until its laterally extending head 71 is engaged by the upper edge of an upwardly extending wall 78 whereby it is retained in inoperative position. In its projected position the bolt engages with the bolt receiving socket K which in the present embodiment is secured to the under surface of the threshold floor plate 79. The member K includes a socket portion 80 and flanges 81—81 to either side thereof and whereby connection is effected with the threshold plate by means of rivets 82. The said bolt 70 in its projected position is retained in operative position by means of a lug 83 beneath which the lateral head 71 is adapted to seat as indicated by full lines in Figs. 3 and 6. The respective locking bolts 49 and 70 are disposed in the angle formed by the inner Z-bar flange 17 and the Z-bar web 15, there being a sleeve-like portion 84 on each of the bracket members 52, 53 and 72 within which the said bolts are mounted, and by thus spacing the door anchoring means well away from the portion of the door proper to which the Z-bar is secured, a very stable support for the door and door jamb is provided. The disposition of the door retaining means in this manner combined with the bracketing of the inner flange and web of the Z-bar member to the door by means of the bracket castings counteracts the rotating tendency of the Z-bar about a vertical axis such as would be brought about by shifting of lading in the car or due to the strains incidental to opening or closing the door as well as those resulting from buffing shocks. Furthermore, the disposition of the mechanism in the box-like space defined by the inner face of the door, the web of the Z-bar and the inner flange of the same thus effectively places the parts out of the path of the doorway and from being accidentally struck and damaged during the handling of lading, and when the door is in open position as indicated by dotted lines in Fig. 6 it will be noted that the mechanism parts are effectively shielded. It will be noted that in their operative fastening position the locking bolt heads are disposed in the direction of movement of the car and thus the tendency to displacement from buffing and pulling shocks is minimized.

On the outer side of the inner flange of the Z-bar 14 there is bolted or otherwise secured a wooden nailing block 85 which provides a suitable nailing piece for receiving a nailing strip 185, to which a temporary lining or grain door 285 may be nailed and thus allow for the carrying of grain and comminuted material.

The hasp sealing device L is of the usual type including a hasp 86 on one door, a staple 87 on the opposite door and a pin 88 cooperating with the latter.

The door supporting track M which is of angular formation and preferably of a rolled section is disposed with one of its flanges 89 in a horizontal plane and its adjacent flange 90 depending vertically. The said track is secured to the car structure through its flanges being secured to bracket castings 91, which in turn are carried by the side sill A of the car. Said supporting brackets also form a carrying means for nailing blocks 92 which support the floor of the car.

Each door is carried on anti-friction bearings N of which there are two per door, disposed at the lower margin thereof. Each of said anti-friction bearings N includes a housing 93 having a roller 94 mounted upon a pivot 95. The housing 93 includes a wall section 96 overlying the main or outer portion of the door and a wall section 97 overlying the inwardly offset depending portion 33, said respective portions being connected to their respective walls by rivets, as indicated at 98 and 99, respectively. The outer wall 96 is extended upwardly a sufficient distance to permit of the rivets 98 extending through the upper flange 37 of the face plate 34, thereby utilizing the housings 93 as graces for the purpose of maintaining the tubular formation against distortion, and operating in conjunction with the diagonal braces 41 and 42 to prevent the said tubular formation from rotating along its horizontal axis. The wall sections 96 and 97 are united by transversely extending vertical walls 100 which in conjunction with the first-named walls define a box-shaped housing open at its top and bottom and within which the roller 94 is mounted. Each roller 94 is disposed with its upper portion extended within the tubular formation, there being a recess 101 cut out in the horizontal flange 32 of the door.

The pivot 95 is disposed entirely in the plane of the depending wall portion 33 and retained in operative position thereby. The outer wall 96 is extended downwardly beyond the door proper and is formed with a U-shape guide 102, which embraces the depending flange 90 of the track M to prevent displacement of the door. The outer wall 96 is braced by a plurality of ribs 103—103, which provide the necessary stiffness to permit of the casing being utilized as a stiffening means for the tubular formation. The arrangement of the castings on the outer side of the door with the upper portion of the rollers contained within the tubular formation permits of easy removal of the housing for inspection or replacement of parts by the simple expedient of cutting four rivets, and furthermore provides a construction wherein the door is disposed only a very short distance above the track and the danger of the housings bending thus minimized.

It will be appreciated from the above description that the invention provides a simple and rigid door construction which is light in weight, is composed of comparatively few parts, provides weather-tight joints and is conductive to ease of operation. Furthermore, the use of the strong tubular construction and the Z-bar vertical marginal member on the auxiliary door, combined with the embossments in the panelling and the strong diagonal braces, provides a door construction of exceptional strength, which when the auxiliary door and main door are locked relatively to each other, provides a closure for the door opening strengthened against bending on vertical, horizontal and diagonal lines.

The construction of door locking mechanism shown in Figs. 4 and 5 illustrates a modification in which the upper and lower bolts are operated in unison. In said drawings 200 indicates the Z-bar jamb, 201 the web of the jamb, 202 the inner flange of the Z-bar; 203 is a bracket, 204 the upper bolt, 205 the lower bolt. A toggle link member 206 is employed having a socket portion 207 formed integrally therewith. A lower toggle link member 208 is also provided, and the respective toggle members 206 and 208 are pivotally connected to each other by a pin 209, and each of said toggle members is pivoted to its associated bolt member by a pivot 210. The bolt 204 is provided with a stop member 211 for the purposes of limiting movement of the bolt.

Figure 6:
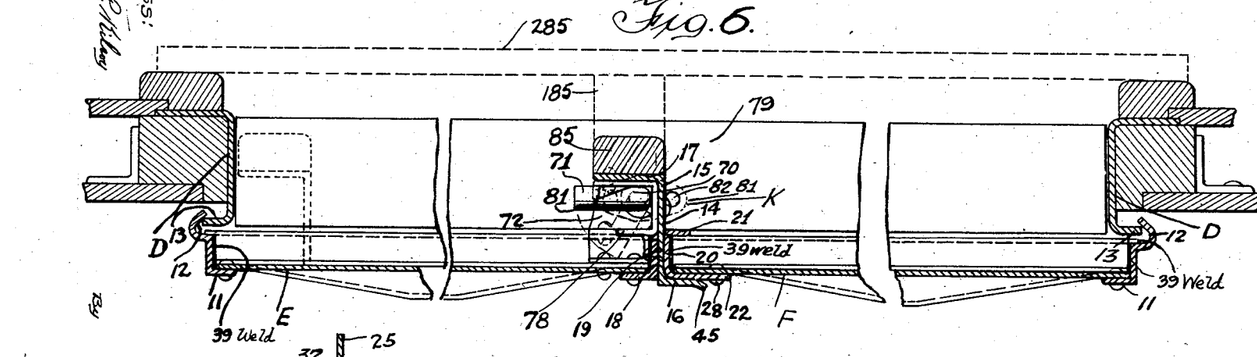
Fig. 6 is a horizontal sectional view on an enlarged scale taken on a line corresponding substantially to the line 6—6 of Fig. 1.
Figures 7, 8:
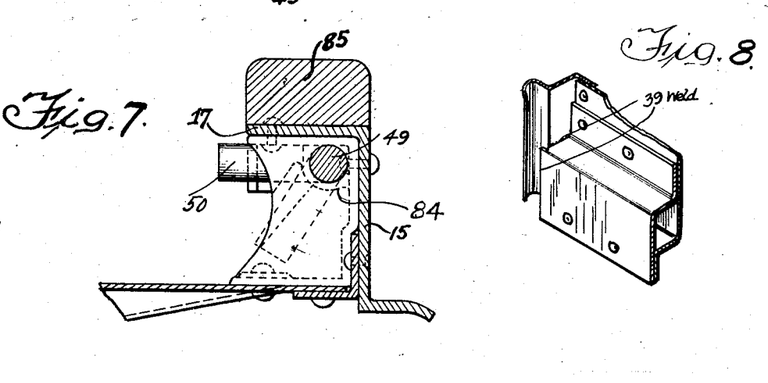
Fig. 7 is a horizontal sectional view of a door detail as taken on a line corresponding substantially to the line 7—7 of Fig. 1.
Fig. 8 is a fragmentary perspective view of the outer lower corner of one of the doors as viewed from the inside of the car.
Figure 9:
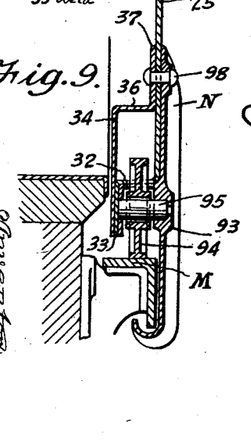
Fig. 9 is an enlarged detail section on the line 9—9 of Fig. 1.

The bolts, as positioned in Figs. 3 and 6, are shown in locked position. Assuming the parts to be positioned as in Fig. 5, the operation of the device is as follows: A bar 212 is inserted in the socket, as indicated by dotted lines and rotation effected in a clockwise direction, which has the effect of moving the pivot 209 outwardly, thus causing the pivots 210 of the respective bolts to approach each other and retracting the bolts from their respective sockets. The retracting movement of the bolts is limited by contact between the lugs 211 and associated brackets.

What we have herein described is the preferred manner of carrying out our invention, but the same is merely illustrative and we contemplate all changes and modifications that come within the scope of the claims appended hereto.

What we claim is:

1. In a car door including a metallic panel disposed in the outer plane of said door, a hollow tubular formation extending along the lower horizontal margin of the door, said tubular formation being formed of two outer and inner integral Z-shaped sections united by their flanges, one of said sections forming an integral part of said metallic panel and presenting an unbroken outer surface along the lower corner of the tubular formation; and rivets for uniting the flanges of said Z-shaped sections, said rivets being confined to said flanges and being disposed outwardly of the tubular formation to render the same accessible.

2. In a car door, the combination with a metallic body member of a hollow tubular formation extending along the lower horizontal margin of the door, said tubular formation being formed of two integral Z-shaped members having unequal flanges defining the vertical depth of the hollow formation, the lesser flange of each member being united by rivets with the greater flange of the other member, thereby providing a hollow tubular formation along the lower edge of the door, the uniting rivets of which are confined to two accessible rows.

3. In a car door formed of appreciable depth, said door having a lower margin in the form of a Z-shape with the web horizontal and continuous flanges respectively disposed in the inner and outer planes of the door; a bracket overlying said door and secured thereto in the respective planes; and a roller carried by said bracket and having a portion thereof extended through the web of the Z-shaped portion.

4. In a car door, the combination with a hollow tubular formation extending along the lower horizontal margin of the door, the lower margin of said door being in the form of a Z-shaped section having continuous flanges; of a roller-supporting bracket overlying the said Z-shaped portion; and a roller carried by the bracket, said roller being extended upwardly within the tubular formation.

5. In a metal car door, the combination with a main body portion including a sheet metal panel, said panel at its lower end being bent in the shape of a Z to present a horizontally extending section and a depending flange spaced inwardly from the main body portion; a perforation formed in the horizontally extending section; and a roller housing overlying the outer side of the door and having inner and outer walls respectively secured to the main body portion and to the depending flange; a pivot member mounted in said walls, said pivot member being disposed beneath the horizontal flange; and a roller mounted on the pivot member and disposed between the walls of the housing, said roller being extended upwardly above the horizontal section and through the perforation therein.

6. In a sliding door, the combination with a marginal framework including vertical marginal members of appreciable depth; of a body section formed of panelling, said panelling having a lower marginal portion inwardly directed to present an inwardly extending horizontal web and thence downwardly to present a downwardly extending flange disposed in the inner plane of the door; a bracket having walls disposed substantially in the respective planes of the door and connected to the door in said planes; a roller disposed between said walls; a pivot member carrying said roller, said pivot member being disposed immediately beneath the horizontal web; and a perforation in the web through which the roller extends.

7. In a metallic door having vertical marginal members of appreciable thickness, the combination with a body plate disposed in substantially the outer plane of the door, said plate having a vertical integral lower marginal portion directed horizontally inwardly an appreciable distance sufficient to provide space for a roller and thence downwardly to present a depending flange spaced inwardly from the main plane of the door; and an integrally formed facing plate disposed on the inner face of the door and overlying the depending flange, said plate being bent in the form of a Z-shape and secured to the depending flange of the door by one of its flanges and to the main body of the plate by the other of its flanges and having a web connecting said flanges to space the wall formed by said facing plate from the vertical portion of said body plate a distance corresponding to the horizontal width of the inwardly directed portion of said body plate thus presenting a hollow tubular formation composed of two integral members extending along the lower edge of the door.

8. In a metallic door having vertical marginal members of appreciable thickness with flanges lying in substantially the outer plane of the door, the combination with body panelling secured to said outer flanges, said panelling at its lower margin having an integral portion offset inwardly and thence downwardly to present a continuous Z-shaped marginal section adjacent the lower margin of the door; of a facing plate disposed on the inner side of the door and secured to said depending flange, said facing plate being extended upwardly above the lower margin of the door and offset inwardly and upwardly thereby presenting a vertical flange overlying and secured to the main panelling of the door, and said facing plate extending horizontally continuously between the vertical reinforcing marginal members and having its ends secured to the latter.

9. In a metallic door, the combination with vertical marginal reinforcing members; of panelling extending between said marginal members and secured thereto, said panelling having a series of horizontally extending corrugations formed therein; a hollow tubular formation along the lower edge of the door, said tubular formation being formed of two Z-shaped sections united by their flanges, said formation including a depending flange on the inner face of the door and an upper flange in substantially the outer plane of the door; and diagonally extending beams secured to the upper flange of the said Z-shaped members, said beams being extended upwardly across the plane of the corrugations and secured to the body of the plate intermediate the corrugations and to said vertical reinforcing members.

10. In a railway car, a pair of sliding doors, one of such doors having at its meeting edge with the companion door a Z-shaped abutting member disposed with the web thereof extending transversely of the main plane of the door for abutment with the meeting edge of the companion door, said Z-shaped member having one of its flanges disposed substantially in the outer plane of the door to overlap the companion door and having its other flange disposed inwardly of the door and spaced an appreciable distance from the inner face of said door, and bracing means interposed between the inner face of the door and the inner flange and web of the Z-shaped member respectively.

11. In a railway car having a doorway and a pair of oppositely sliding doors adapted to extend across said doorway, one of such doors having a Z-shaped marginal reinforcing member at the outer edge of the door, said member being disposed with its web extending transversely of the door and having one of its flanges extending outwardly of the companion door and having its other flange spaced inwardly away from the inner face of the door; a cooperating nailing strip disposed on the outer face of said last-named flange; and locking means mounted transversely in line with said nailing strip and between said inner flange and the inner face of said door.

12. In a railway sliding metallic car door; sheet metallic panelling disposed in substantially the outer plane of the door; a Z-bar vertical marginal reinforcement for the outer edge of the door, said Z-bar being of greater depth than the door and disposed with its web extending transversely of the door and having one of its flanges disposed in substantially the outer plane of the door and the other flange disposed inwardly of the door and spaced beyond the inner face of the door; said web providing an abutting surface for cooperation with the companion door and an angle-shaped connection between the metallic panelling and web of the Z-bar to support said Z-bar against rotation about its long axis.

13. In a railway car, a pair of sliding doors, one of such doors having a marginal frame including a Z-shaped marginal member disposed with the web thereof extending transversely of the main plane of the door and with the flanges of the Z-shaped member respectively disposed inwardly and outwardly of the door, said outer flange being adapted to overlap the companion door and the inner flange being spaced outwardly from the inner face of the door the web of said Z-shaped member forming a striking surface for the companion door; metallic panelling secured to said framework in the outer plane thereof, and door anchoring mechanism disposed intermediate the said inner flange and inner face of the panelling of said door and at the inner side of said web.

14. In a railway car having a doorway and a pair of sliding doors adapted to extend across said doorway, one of such doors having a marginal member of Z-shape along the forward edge, said member having its web disposed transversely of said door, anchoring means on the inner side of the door, said anchoring means including: a reciprocal and rotatable bolt at the lower portion of the door, said bolt having a laterally extending head; a pocket on the car structure adapted to receive the bolt to maintain the door in adjusted position; and means for maintaining said bolt in engagement with its associated socket, said means including an abutment on the door adapted to lie in the path of the bolt head when the locking bolt is in operative fastening position.

15. In a railway car, oppositely disposed sliding doors, including a main sliding door and an auxiliary sliding door, said auxiliary sliding door including vertical reinforcing members of angular formation and metal panelling secured thereto, each of said angular vertical members including a flange overlying the metal panelling of the door and having the adjacent flange extending transversely of the door of greater depth than said angular members, and a Z-shaped marginal member at the meeting edge of the doors, secured to the adjacent transversely extending flange whereby one flange of the Z-shaped member is disposed to extend in the plane of the door beyond the angular vertical member, and the outer flange is disposed transversely in line with said adjacent flange.

16. In a railway car, the combination with the car framing; of a sliding door having a marginal member of Z-shape along its forward edge, said member having its web disposed transversely of said door; a sleeve connected to said marginal member; a rotatable and reciprocal bolt mounted in said sleeve, said bolt having a laterally extending head outstanding from one end thereof; means providing a pocket on the car framing into which the bolt is adapted to be projected to maintain the door in adjusted position; and two abutments connected to said marginal member and spaced lengthwise of the door, one of said abutments being adapted to engage the bolt head to maintain the bolt in projected position, and the other of said abutments being adapted to engage the bolt when in retracted position.

17. In a railway car having a doorway and a pair of sliding doors adapted to seal said doorway, one of such doors having a marginal member of Z-shape along its forward edge anchoring means on the inner side of the door and connected with said marginal member, said anchoring means including reciprocable and rotatable bolts at the upper and lower portions of the door, and means providing pockets on the car framing adapted to receive said bolts; means for maintaining said bolts in anchoring position; and means for maintaining said bolts in inoperative position.

18. In a railway car, the combination with the car frame, of a door slidably mounted relatively to said frame; a socket member carried by the car framing; a reciprocable and rotatable bolt carried by the door and movable into engagement with the socket member to anchor the door, said bolt having a handle extending laterally therefrom; and a bracket within which said bolt is adapted to have reciprocatory movement, said bracket having two lugs spaced from each other lengthwise of the bolt and disposed in different angular relations relatively to the axis of the bolt, one of said lugs being adapted to engage the head of the bolt to maintain the bolt in operative position and the other of said lugs being adapted to engage with the bolt to retain the same in inoperative position.

19. In a railway car having a doorway and a pair of sliding doors adapted to seal said doorway, one of such doors being in the nature of an auxiliary door and having a Z-shaped marginal reinforcing member at the outer edge of the door with its inner flange extending inwardly away from the door opening, said Z-shaped member being of greater depth than the door to space said inner flange from the inner face of the door and disposed with its web transversely of the door said Z-shaped member having its web and outer flange extending in overlapping relation with the companion door when the doors meet; and door locking mechanism carried by the door in the space between said inner face of the door and the inner flange of the Z-member.

20. In a railway car, having a doorway, oppositely sliding doors adapted to close the said opening, one of said doors having a door jamb at the meeting edges of the doors said jamb being composed of a Z-bar disposed with its web at right angles to the main plane of both doors and having the inner flange of the Z-bar spaced away from the meeting edge of the door and having its web and outer flange extended to overlap the companion door when the doors meet, bracket means disposed in the space between said inner flange and inner face of the door; and door anchoring means mounted in said bracket means.

21. In a railway car, oppositely sliding doors adapted to meet to close a door opening, said doors including a main door and an auxiliary door, said auxiliary door including metallic panelling and members of angular formation at the vertical margins of said panelling, each of said angular members having one of its flanges overlying the metallic panelling secured thereto and having the adjacent flange extending transversely of the main plane of the door; and a Z-shaped marginal member at the meeting edges of the door secured to the transversely extending flange of the adjacent vertical angular member, said Z-shaped member being of greater depth than the depth of the door and having its web secured to the transversely extending flange of the adjacent vertical member and disposed with its outer flange to overlap the companion door when the said doors are in meeting relation and with its inner flange spaced an appreciable distance inwardly from the inner face of said door.

22. In a metallic door construction of the character described, the combination with a main sliding door and an auxiliary sliding door, each said door including transverse walls adapted to meet in abutting relation, said auxiliary door being provided along its vertical front edge, with a metal reinforcing member forming an abutment for the main door and having a section extending in a general direction transverse to the plane of the door and inwardly beyond the inner face of the door and provided with a nailing strip at its inner edge, said reinforcing member being provided along its outer edge with a forwardly projecting section member adapted to overlap the companion door when the doors are in meeting relation whereby said reinforcing member reinforces the forward edge of the auxiliary door, forms an abutment for the outer edge of the main door, and presents a flange adapted to overlap said other door and thereby provide weather protection at the meeting edges of the doors.

23. A car door having a tubular formation along its lower edge; a roller and an axle for said roller, said roller projecting into said tubular formation and said axle being supported beneath the tubular formation.

24. An auxiliary door having a main body portion and means extending to one side of said main body portion to provide elements for supporting a nailing strip at one side of said main body portion; and anchoring means interposed between the nailing strip supporting elements and the main body portion of the door and transversely in line with said supporting elements.

25. In a railway car, the combination of an auxiliary door disposed on the outer side of the car, said door having a main body portion and a reinforcing element at the forward edge of the door, said element having a projecting flange portion adapted to extend in overlapping relation outwardly of a companion sliding door, said element having a web section extending transversely inwardly of the car beyond the inner face of the main body portion and provided with a wall section extending at right angles to said web portion, said last named wall section being spaced lengthwise of the door and on the side of the web opposite to the overlapping flange section; a nailing strip carried by said inwardly spaced wall section; and door anchoring means disposed within the space defined by the main body of the door, the transversely extending web section and nailing strip carrying wall section.

In witness that we claim the foregoing, we have hereunto subscribed our names this 13th day of August, 1928.

ARGYLE CAMPBELL.
GEO. B. WILLARD.